(12) United States Patent
Okamoto (10) Patent No.: US 7,706,680 B2
(45) Date of Patent: Apr. 27, 2010

(54) DIGITAL CAMERA

(75) Inventor: Teppei Okamoto, Saitama (JP)

(73) Assignee: Hoya Corporation, Tokyo (JP)

( * ) Notice: Subject to any disclaimer, the term of this patent is extended or adjusted under 35 U.S.C. 154(b) by 335 days.

(21) Appl. No.: 11/349,089

(22) Filed: Feb. 8, 2006

(65) Prior Publication Data

US 2006/0177211 A1 Aug. 10, 2006

(30) Foreign Application Priority Data

Feb. 9, 2005 (JP) ............................ P2005-032993

(51) Int. Cl.
*G03B 17/24* (2006.01)
(52) U.S. Cl. .................... 396/321; 348/231.3
(58) Field of Classification Search ................ 396/310, 396/439, 321; 348/231.3, 231.6
See application file for complete search history.

(56) References Cited

U.S. PATENT DOCUMENTS

| | | | |
|---|---|---|---|
| 5,721,989 A | 2/1998 | Kitazawa et al. | |
| 6,947,580 B1* | 9/2005 | Kinsella | 382/124 |
| 2003/0163716 A1* | 8/2003 | Robins et al. | 713/193 |
| 2004/0201739 A1* | 10/2004 | Kuwayama | 348/231.3 |
| 2005/0146621 A1* | 7/2005 | Tanaka et al. | 348/211.2 |

FOREIGN PATENT DOCUMENTS

| | | |
|---|---|---|
| JP | 6-014229 | 1/1994 |
| JP | 2002-218389 | 8/2002 |
| JP | 2002-281439 | 9/2002 |
| JP | 2002-354318 | 12/2002 |
| JP | 2003-298998 | 10/2003 |
| JP | 2004-153430 | 5/2004 |
| JP | 2004-252562 | 9/2004 |

OTHER PUBLICATIONS

English Translation of Takeshi Tanaka, Digital Camera, Application No. 10-309454, Filing Date: Oct. 15, 1998, Publication Number: JP 2000-125237, Publication Date: Apr. 28, 2000.*
English Language Abstract of JP 6-014229.
U.S. Appl. No. 11/347,382 to Okamoto, filed on Feb. 6, 2006.

* cited by examiner

*Primary Examiner*—Christopher E Mahoney
*Assistant Examiner*—Fang-Chi Chang
(74) *Attorney, Agent, or Firm*—Greenblum & Bernstein, P.L.C.

(57) ABSTRACT

A digital camera to which a storage medium can be connected, includes a profile information storer and a profile information reader. The profile information storer stores profile information representing a storage medium user in the storage medium connected to the digital camera. The profile information reader reads the profile information.

15 Claims, 7 Drawing Sheets

DIGITAL CAMERA

BACKGROUND OF THE INVENTION

1. Field of the Invention

The present invention relates to a digital camera and a digital camera system, especially to a digital camera having a user identifying function, and to a digital camera system including such a digital camera and a storage medium.

2. Description of the Related Art

Generally, in digital cameras, a storage medium is connected to a digital camera and is used for storing photographed images. A storage medium in which images are stored, is detached from the digital camera and photographed images stored therein are replayed on a computer.

In the case where a digital camera to which a storage medium is attached, is used by a plurality of users, the storage medium used by one user may be initialized by another user and image data stored in the storage medium may be deleted.

SUMMARY OF THE INVENTION

Therefore, an objective of the present invention is to provide a digital camera which has a user identifying function, and which can store information representing the identified users of the digital camera in a storage medium, and which can judge whether an identified user using the digital camera matches a user represented by the information previously stored in the storage medium, or not.

A digital camera according to the present invention, to which a storage medium can be connected, includes a profile information storer and a profile information reader. The profile information storer stores profile information representing a storage medium user in the storage medium connected to the digital camera. The profile information reader reads the profile information.

A digital camera system according to the present invention, includes a storage medium and a digital camera. The digital camera to which the storage medium can be connected, includes a profile information storer that stores profile information representing a storage medium user in the storage medium connected to the digital camera, and a profile information reader that reads the profile information.

BRIEF DESCRIPTION OF THE DRAWINGS

The present invention will be better understood from the description of the preferred embodiments of the invention set forth below together with the accompanying drawings, in which.

DESCRIPTION OF THE PREFERRED EMBODIMENT

Hereinafter, the preferred embodiment of the present invention is described with reference to the attached drawings.

Figure 1:
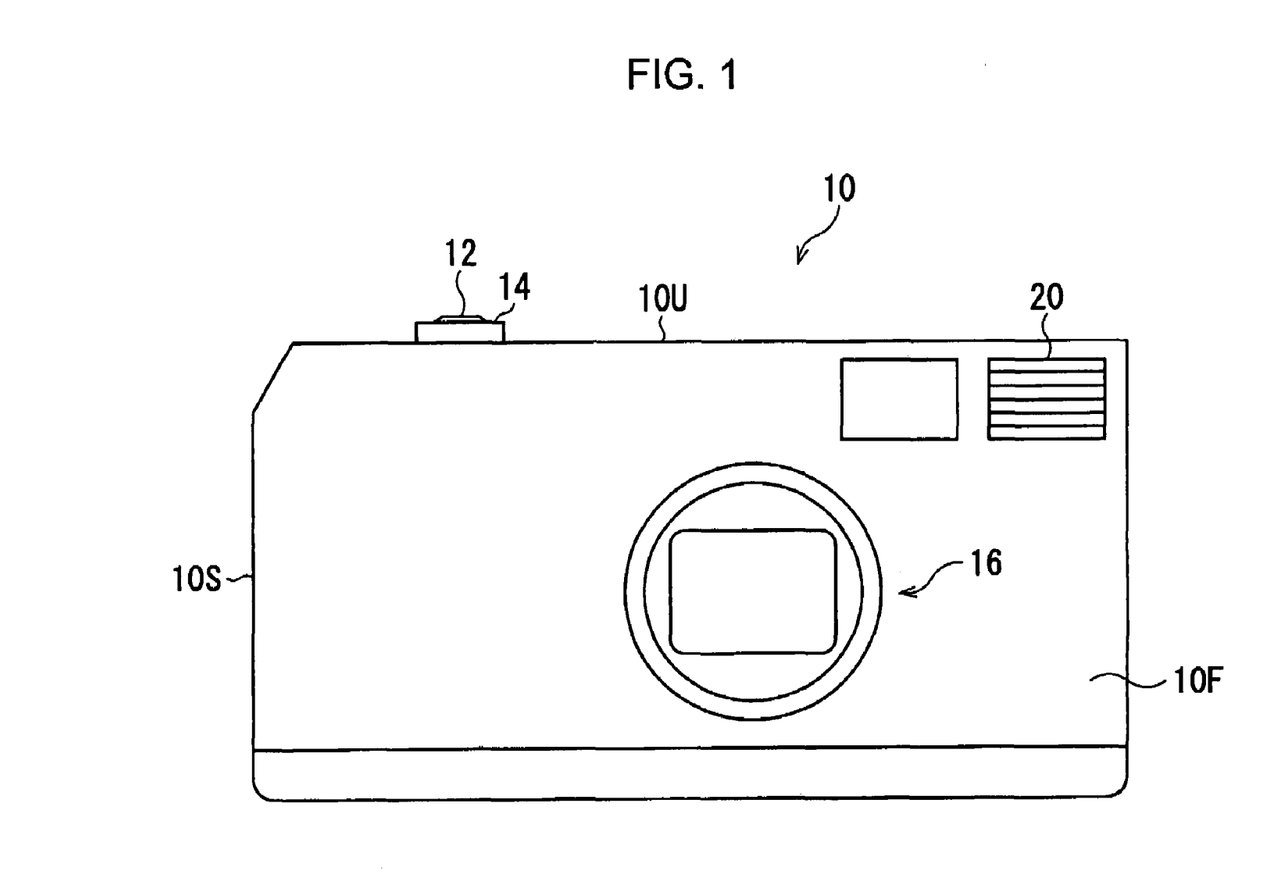
FIG. 1 is a front view of the digital camera of the embodiment.
Figure 2:
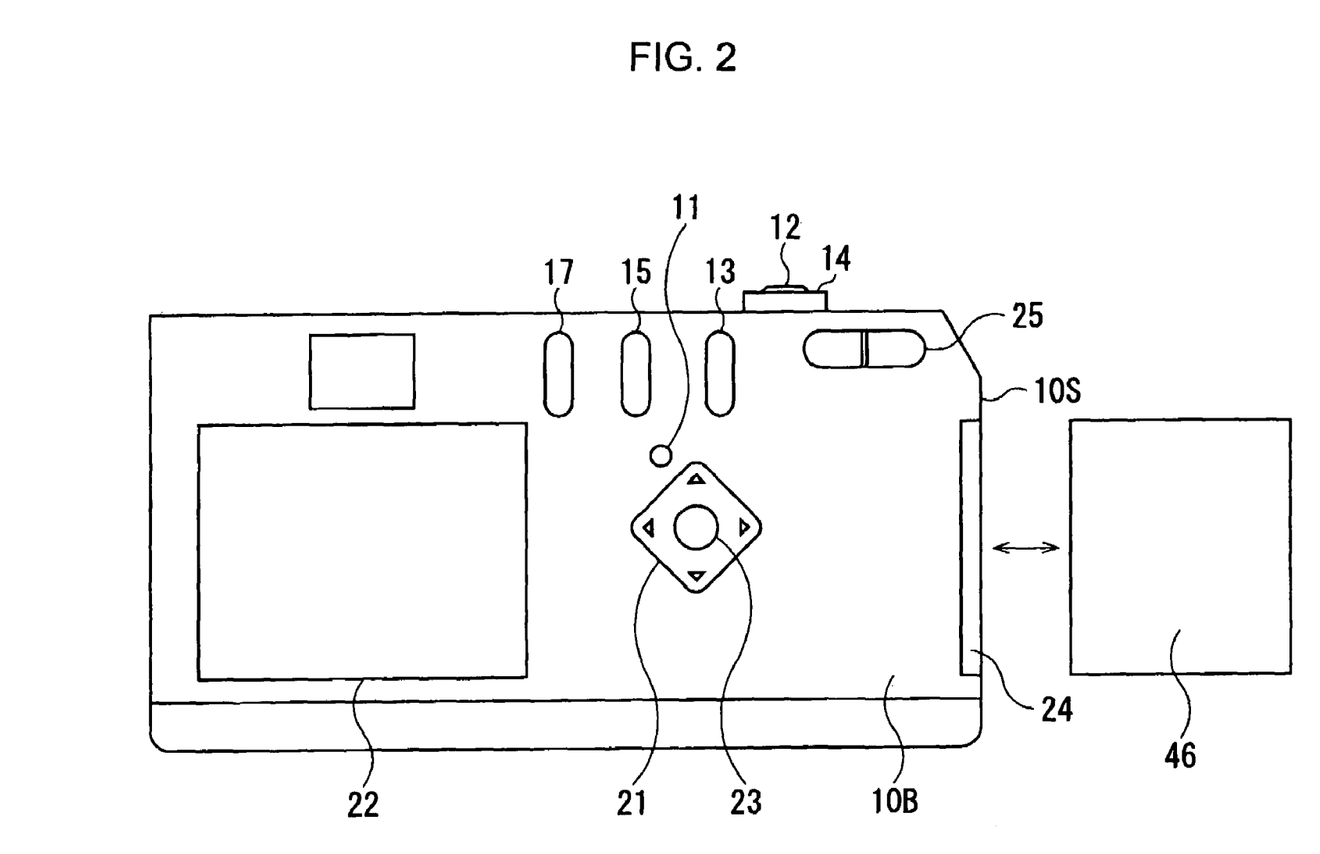
FIG. 2 is a rear view of the digital camera.

FIG. 1 is a front view of the digital camera of the embodiment. FIG. 2 is a rear view of the digital camera.

On an upper surface 10U of the digital camera 10, a release button 12 and a mode dial 14 are provided. On a front surface 10F of the digital camera 10, a photographing optical system 16 including a zoom lens, and a lighting device 20 are provided. Further, on a rear surface 10B of the digital camera 10, an LCD monitor 22 for displaying a subject image, a menu button 11, a focus setting button 13, a flash setting button 15, an image deleting button 17, a cross key 21, an OK button 23, and a zoom lever 25 and so on are provided (see FIG. 2). On a side surface 10S of the digital camera 10, a slot (not shown) for inserting a memory card 46 for storing image data and a memory card cover 24 for covering the slot are provided. The memory card 46 is inserted into the digital camera 10 to store photographed images and is detached through the slot in accordance with need.

Figure 3:
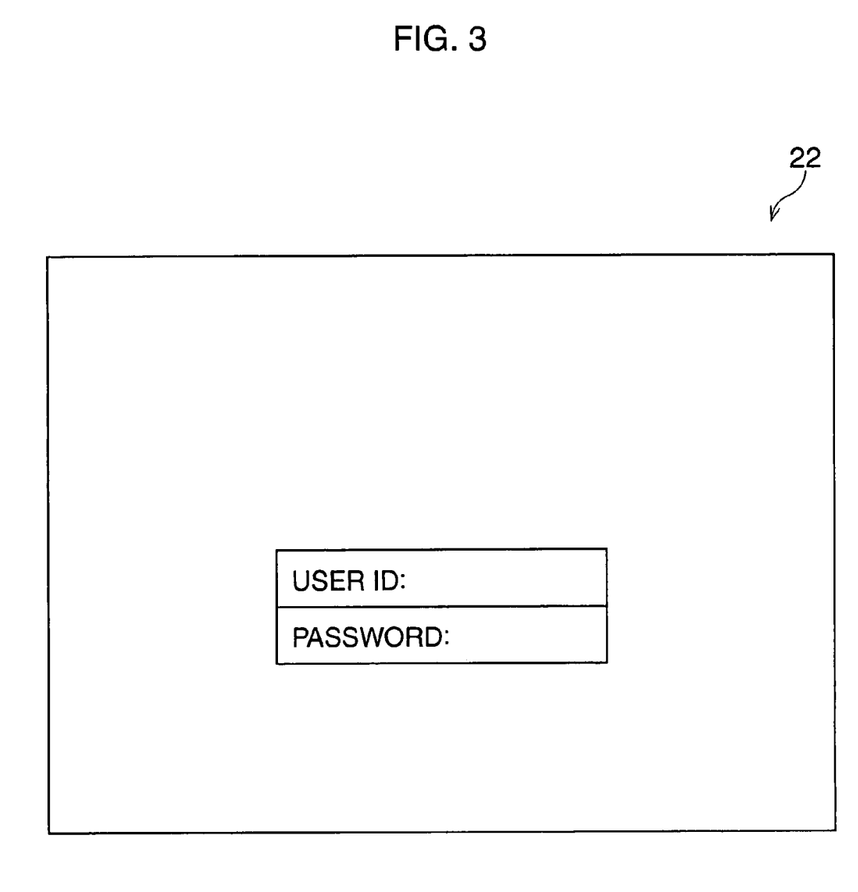
FIG. 3 is a view representing a screen displayed on the LCD monitor for inputting a user identification code.

FIG. 3 is a view representing a screen displayed on the LCD monitor 22 for inputting a user identification code.

When the digital camera 10 is used for the first time, an initial set-up process is carries out by the user. For the set-up process, predetermined screens are automatically displayed on the LCD monitor 22. One of the screens for the initial set-up process, is for registering a user as shown in FIG. 3. A user who uses the digital camera 10 for the first time, is registered as an owner user (a predetermined user), by inputting a user identification code and a password on the screen by using the cross key 21, the OK button 23, and so on.

The owner user registered in the digital camera 10, can register other new users as regular users who are allowed to use the digital camera 10. In this case, the menu selection screen is displayed on the LCD monitor 22 by pressing the menu button 11, and then the screen for inputting a user identification code (called the input screen hereinafter) shown in FIG. 3 is displayed being selected on the menu selection screen. When a new user who is allowed to use the digital camera 10 inputs his user ID and a password, the user is registered as a regular user. As mentioned above, a user who can use the digital camera 10, is registered as an owner user who has predetermined authorities, or as a regular user who is permitted to use the digital camera 10 by the owner user. Hereinafter, the owner user and the regular user are called a registered user.

On the other hand, at every starting time of the digital camera 10, excluding the first starting time for usage, the input screen is automatically displayed for identifying the user. Only in the case where a user identification code and a password input by the user attempting to use the digital camera 10 matches to those of a registered user previously registered, the digital camera 10 becomes operable.

Figure 4:
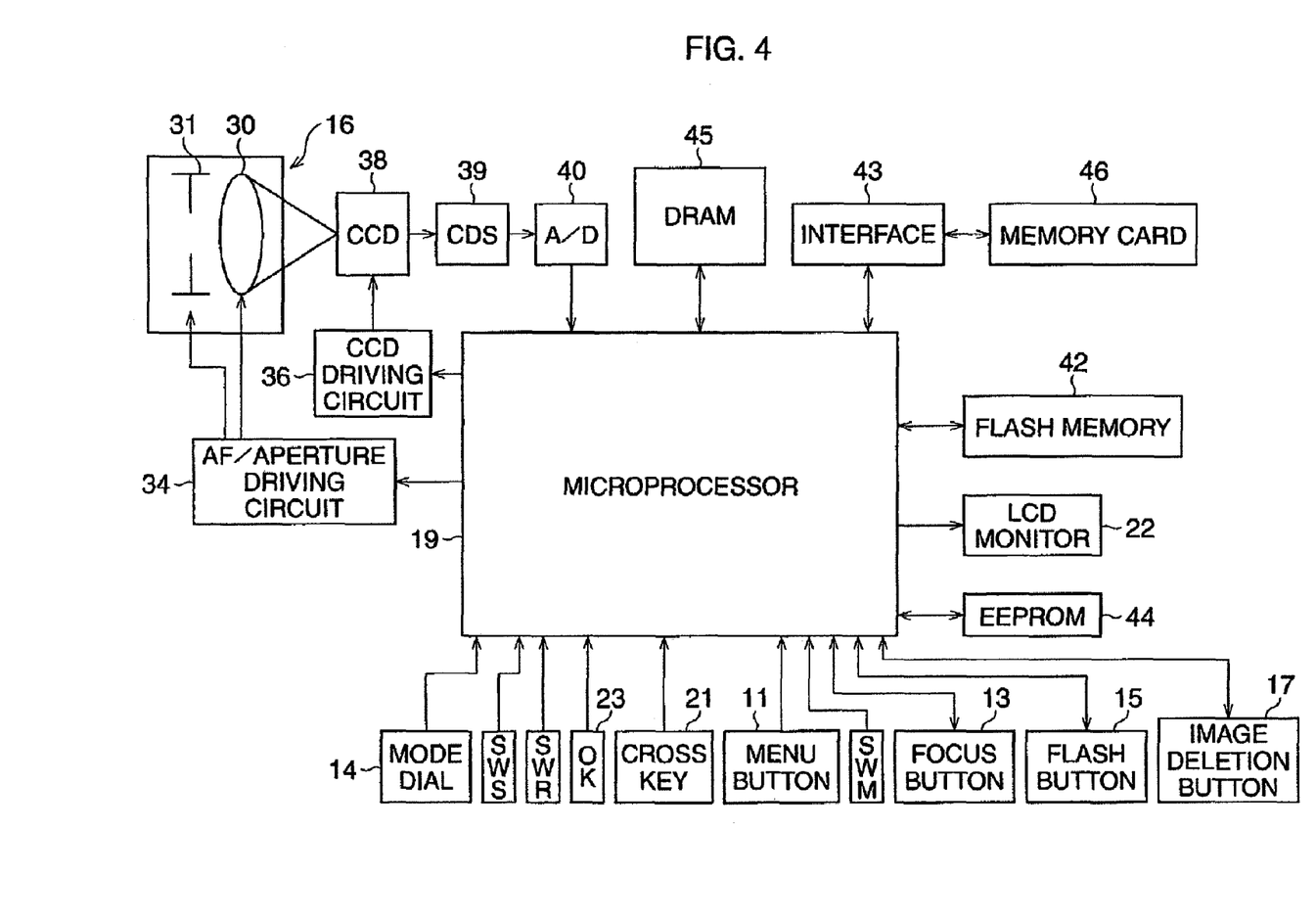
FIG. 4 is a block diagram of the digital camera.
Figure 5:
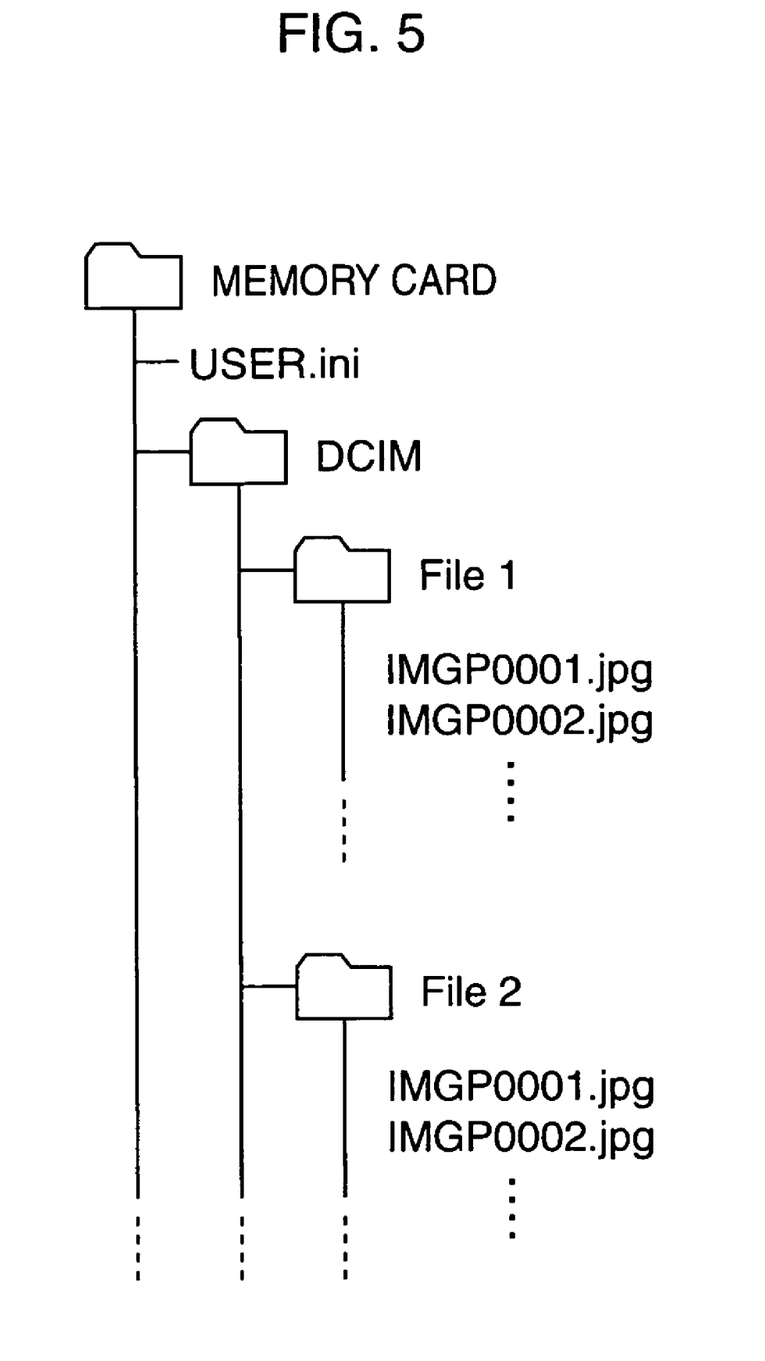
FIG. 5 is a conceptual view representing profile information stored in the memory card.

FIG. 4 is a block diagram of the digital camera 10. FIG. 5 is a conceptual view representing profile information stored in the memory card 46.

In the digital camera 10, a microprocessor 19 for controlling all of the digital camera 10, a flash memory 42 being built-in for storing image data and so on, an EEPROM 44 in which data for processing signals in the microprocessor 19 is stored, and so on are provided. To the microprocessor 19, a main switch SWM, a mode dial 14, and so on are connected.

The main switch SWM is a power switch for the digital camera 10, and the microprocessor 19 starts when the main switch SWM is turned on by an operation of the user.

The microprocessor 19 transmits predetermined signals to the LCD monitor 22, so that the input screen is displayed. When a user ID and password are input, signals corresponding to the input information are transmitted to the microprocessor 19. In the microprocessor 19, whether the combination of the user ID and the password represented by the signals, corresponds to one of those of registered users previously stored in the flash memory 42, or not is judged. Only when it is judged that the combination of the user ID and the password corresponds to one of those of the registered users, does the digital camera 10 become operable. On the other hand, when it is judged that the combination of the user ID and the password does not correspond to one of those of a registered user, any operation except for turning the power to the digital camera off and inputting user IDs and passwords is invalidated by the microprocessor 19, and this continues as long as a user ID and a password corresponding to those of a registered user are not input. Therefore, it can be identified that a user using the digital camera 10, is one of the registered users. When the operation of the digital camera 10 by a person other than a registered user is attempted, the operation is invalidated, and a warning message is displayed on the LCD monitor 22 to inform the person that the digital camera 10 has not become operable, based on the signals from the microprocessor 19.

A mode for photographing a subject, and other modes for replaying an image and so on, are selectively set by an operation of the mode dial 14 to be in predetermined rotating positions, and signals corresponding to the position of the mode dial 14 are transmitted to the microprocessor 19. The menu button 11, the focus setting button 13, the flash setting button 15, the image deleting button 17, the cross key 21, and the OK button 23 are connected to the microprocessor 19. When these buttons and a key are operated, signals corresponding to the operation are transmitted to the microprocessor 19. Users can select various parameters for photographing and so on by operating these buttons.

When the release button 12 is half depressed, a photometry-measuring switch SWS is turned on. When the photometry-measuring switch SWS is turned on in a photographing mode, a subject distance is measured by a distance-measuring device (not shown), and photometry of a subject is measured by a photometry-measuring device (not shown). The obtained distance and photometry data are transmitted to the microprocessor 19. The microprocessor 19 controls an AF/aperture driving circuit 34 to adjust the position of a photographing lens 30 for focusing.

When the release button 12 is fully depressed, a release switch SWR is turned on. When the release switch SWR is turned on, an aperture 31 is opened by a predetermined amount by the AF/aperture driving circuit 34, and a shutter (not shown) is opened to the predetermined position for a predetermined time based on the control signals from the microprocessor 19. In the case an aperture value and a shutter speed are previously selected and set by the user, the aperture 31 and the shutter are driven according to each of the set parameters. And then the CCD 38 controlled by a CCD driving circuit 36 is exposed, so that image signals according to the image are generated in the CCD 38. When it is judged that illuminating a subject is necessary based on the distance and photometry data by the microprocessor 19, control signals are transmitted to a flash circuit (not shown) from the microprocessor 19, and the lighting device 20 emits illuminating light.

Image signals generated by the CCD 38 are processed to reduce noise at a CDS circuit 39 and are converted from analog to digital signals by an A/D converter 40. The digitalized image signals are transmitted to the microprocessor 19 after various processes such as white balance adjustment. Image signals are further transmitted to an LCD driver (not shown) from the microprocessor 19, the LCD monitor 22 is driven based on the image signals, and a subject image is displayed on the LCD monitor 22.

Image data of the photographed subject image is temporally stored in a DRAM 45, and stored in the flash memory 42 at the recording size previously selected, for example "1600× 1200" pixels. The image data is transmitted to a memory card 46 inserted into the body of the digital camera 10 via an interface 43, and is also stored in the memory card 46. Image data is stored to be related to user information based on the user ID input by the registered user who photographed the image. Therefore, which one of the registered users is the photographer of each image can be identified by the microprocessor 19.

Whether or not profile information representing a user of the memory card 46, is already stored in the memory card 46 inserted into the digital camera 10 is judged by the digital camera 10. And when the profile information is not stored, the profile information is provided to the memory card 46. That is, the profile information representing the registered user currently using the digital camera 10 identified by the microprocessor 19 based on the user ID input at the starting time, as a user of the memory card 46 is generated by the microprocessor 19 based on the user ID. The generated profile information is transmitted to the memory card 46, and stored. The profile information shown as "USER. ini" is stored in the route directory of the memory card 46, and image data is stored in sub directories shown as "File 1" or "File 2" (see FIG. 5).

When it is judged that the profile information is already stored in the connected memory card 46 by the digital camera 10, the profile information can be read. That is, when the memory card 46 is inserted into the digital camera 10, the profile information is read by the microprocessor 19, and whether the registered user that the read profile information represents, is the registered user who is using the digital camera 10 at the time or not, is judged.

As a result of this, when the profile information is already stored in the memory card 46, and the registered user that the read profile information represents is the same as the registered user who is using the digital camera 10 at the time, the memory card 46 becomes fully operable and any operation for the memory card can be carried out. In this case, the registered user who is using the digital camera 10 can store photographed images in the memory card 46, can select the replay mode by an operation of the mode dial 14 and images replayed on the LCD monitor 22 can be successively changed by an operation of the cross key 21, can delete image data stored in the memory card 46 by a depression of the image deleting button 17, and can initialize the memory card 46.

The initialization which is a process for deleting all data stored in the memory card 46, is carried out by the following operations. First, the menu selection screen is displayed on the LCD monitor 22 by an operation of the menu button 11 and so on, and the initialization of the memory card 46 is ordered by the registered user. Based on control signals transmitted from the microprocessor 19 via the interface 43, all image data stored in the memory card 46 is deleted. When this initialization of the memory card 46 finishes, the profile information representing the registered user using the digital camera 10, is automatically transmitted to the memory card 46 from the microprocessor 19 and is stored in the memory card 46.

In case the user represented by the profile information is the same as the registered user currently using the digital camera 10, deleting the profile information can also be carried out. In this case, the menu selection screen is displayed on the LCD monitor 22, and when the menu item for deleting the profile information is selected by the using registered user, the profile information stored in the memory card 46 is deleted based on the control signals transmitted from the microprocessor 19. Note that in the case where the user represented by the profile information does not correspond to the registered user currently using the digital camera 10, when the registered user currently using the digital camera 10 is the owner user, the profile information can be deleted by the owner user.

In the case where the profile information is not read from the memory card 46, the same as the case where the user represented by the profile information stored in the memory card 46 inserted in the digital camera 10, corresponds to the registered user who is using the digital camera 10, all operations for the memory card 46 can be carried out. Therefore, in this case, the profile information representing the registered user currently using the digital camera 10, as a user of the memory card 46, is also transmitted to the memory card 46 from the microprocessor 19 after initialization of the memory card 46, and is stored in the memory card 46.

On the other hand, in the case where the profile information has already been stored in the memory card 46, and the registered user represented by the read profile information does not correspond to the registered user currently using the digital camera 10, the memory card 46 can be used, however, not all operations for the memory card 46 can be carried out. That is, in this case, the registered user currently using the digital camera 10 can store images photographed by himself in the memory card 46, can replay the images on the LCD monitor 22, and can delete the images photographed by himself and stored in the memory card 46, however, initializing the memory card 46 is not allowed, and the image data of the images photographed by other registered users before the current user started to use the digital camera 10 and stored in the memory card 46, can not be deleted. These controls for operations of the memory card 46 can be carried out because image data is stored to be related to the user information representing the registered user who photographed the image. When initializing the memory card 46 and deleting the image data are not allowed, although they are ordered, a warning message to inform the current registered user that the operation ordered can not be conducted, is displayed on the LCD monitor 22 based on control signals from the microprocessor 19.

Note that when the registered user represented by the profile information does not correspond to the registered user currently using the digital camera 10, images photographed by the other registered users and already stored, may not be displayed on the LCD monitor 22. In this case, as mentioned above, the registered user currently using the digital camera 10 can not order the deletion of the data of the images.

Figure 6:
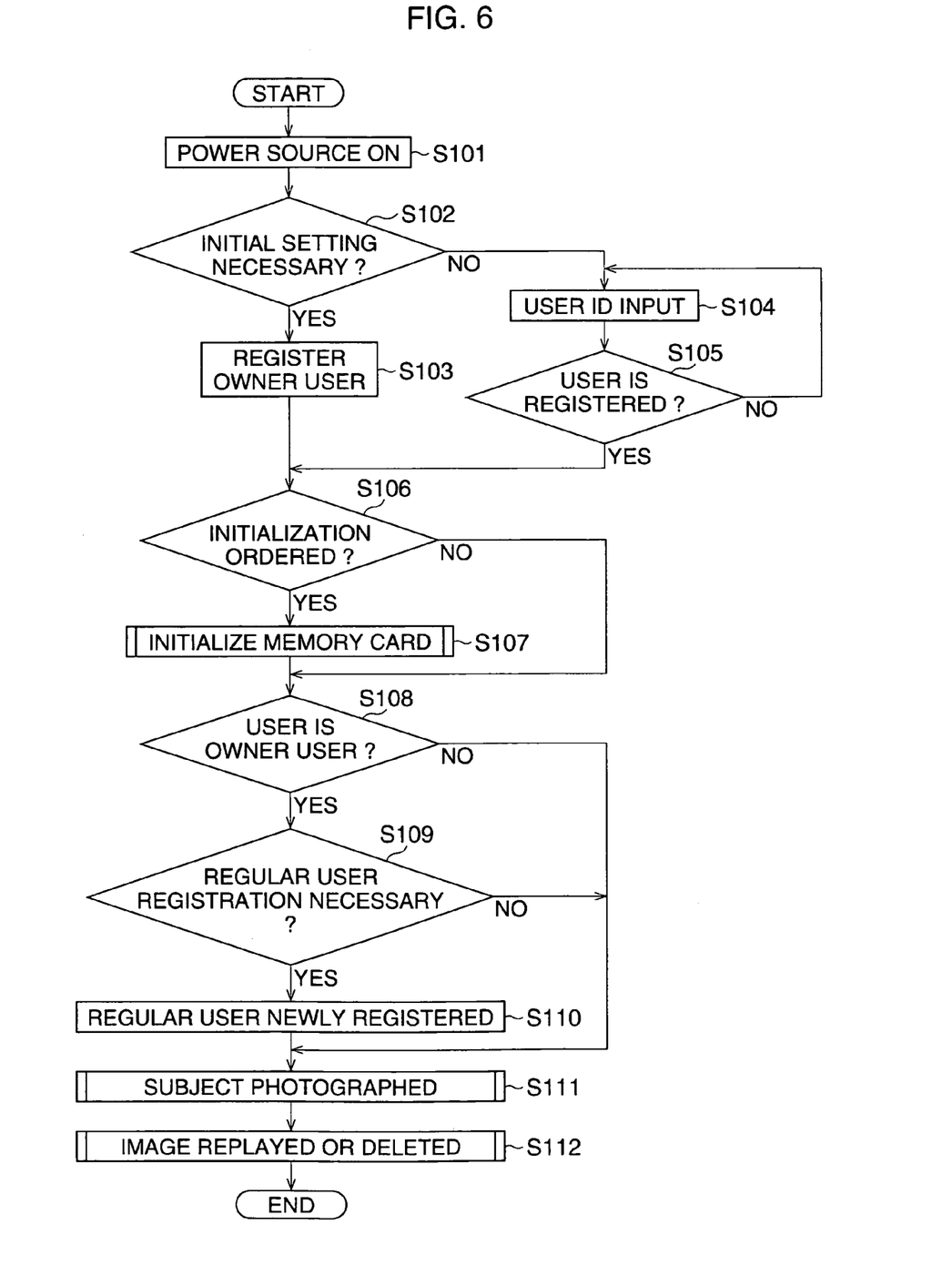
FIG. 6 is a flowchart representing a user registration routine.

FIG. 6 is a flowchart representing a user registration routine.

The user registration routine starts when the main switch SWM is turned on by a user. At step S101, the power source of the digital camera 10 is turned on and then the process proceeds to step S102. At step S102, whether or not a user is registered and initial setting for the digital camera 10 is necessary, is judged. When it is judged that the initial setting for the digital camera 10 is necessary, the process proceeds to step S103, and when it is judged that the initial setting for the digital camera 10 is not necessary, the process proceeds to step S104. At step S103, an owner user is registered by inputting a user ID and a password, and the process proceeds to step S106.

At step S104, a user ID and a password are input on the input screen displayed on the LCD monitor 22, and the process proceeds to step S105. At step S105, whether or not a user attempting to use the digital camera 10 is a registered user, that is, whether or not the combination of the input user ID and the password accords with a combination previously stored in the flash memory 42, is judged by the microprocessor 19. When it is judged that the user attempting to use the digital camera 10 is a registered user, the process proceeds to step S106.

At step S106, whether the initialization of the memory card 46 is ordered or not is judged. When it is judged that the initialization is ordered, the process proceeds to step S107, and when it is judged that initialization is not ordered, the process proceeds to step S108. At step S107, a memory card initialization routine to initialize the memory card 46 is carried out (see FIG. 7), and the process proceeds to step S108.

At step S108, whether the user currently using the digital camera 10 is the owner user or not is judged. When it is judged that the user currently using the digital camera 10 is the owner user at step S108, it is further judged whether new registration for a regular user allowed to use the digital camera 10 is necessary or not, at step S109. When it is judged that new registration for a regular user is necessary, a regular user is newly registered by an operation of the owner user at step S110, and the process proceeds to step S111. At step S111, a subject is photographed, and the process proceeds to step S112. At step S112, a photographed image is replayed or deleted, and the user registration routine ends.

Figure 7:
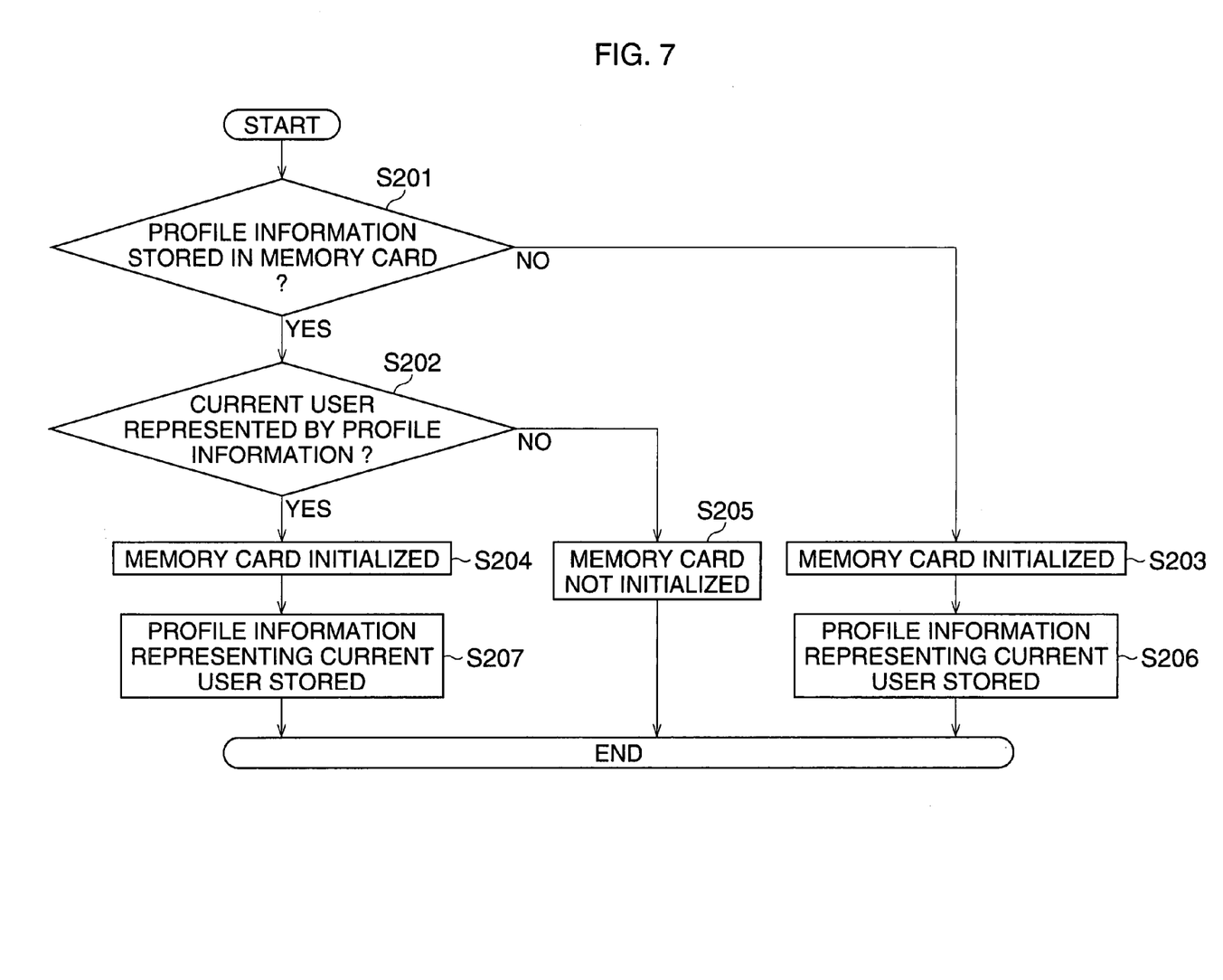
FIG. 7 is a flowchart representing a memory card initialization routine.

FIG. 7 is a flowchart representing a memory card initialization routine.

The memory card initialization routine starts when the initialization of the memory card 46 is ordered at the user registration routine (at step S106). At step S201, whether the profile information is stored or not is judged. When it is judged by the microprocessor 19 that the profile information is stored, the process proceeds to step S202, and when it is judged that the profile information is not stored, the process proceeds to step S203. At step S202, whether the registered user represented by the profile information corresponds to the registered user currently using the digital camera 10 or not, is judged. When it is judged that the registered user represented by the profile information corresponds to the registered user currently using the digital camera 10, the process proceeds to step S204, and when it is judged that the registered user does not correspond to the current user, the process proceeds to step S205.

At step S203, the memory card 46 is initialized and the process proceeds to step S206. At step S206, the profile information regarding the registered user currently using the digital camera 10 as the user of the memory card 46, is stored in the memory card 46, and the memory card initialization routine ends. Similar to steps S203 and S206, the memory card 46 is initialized at step S204 and the profile information regarding the registered user currently using the digital camera 10 is stored in the memory card 46 at step S207.

On the other hand, at step S205, a warning message is displayed on the LCD monitor 22 to inform the current user that the memory card 46 can not be initialized, no initialization carried out, and the memory card initialization routine ends.

In the embodiment mentioned above, the digital camera 10 is provided which can identify the user currently using the digital camera 10, store information representing the identified user as the user of the memory card 46 in the memory card 46, and judge whether the user represented by the information previously stored in the memory card 46 corresponds to the user of the digital camera 10 who is currently using the digital camera 10. Therefore, in a case where a plurality of users use the digital camera 10 with the memory card 46, the situation where the memory card 46 used by a user is initialized by another user by mistake, and so on is prevented, so that image data is protected.

Note that in this embodiment, it is judged whether the profile information is stored in the memory card 46 or not at step S201 in the memory card initialization routine, after the initialization order for the memory card at step S106 in the user registration routine. However, this judgment at step S201 can be conducted before the initialization order at step S106. In this case, when it was judged that the profile information was not stored in the memory card 46, new profile information representing the current user is transmitted from the microprocessor 19 and stored in the memory card 46, therefore, the initialization of the memory card 46 is necessarily carried out, without a step for judgment corresponding to the step S202 in this embodiment.

When a registered user represented by the profile information stored in the memory card 46 does not correspond to the registered user currently using the digital camera 10, any usage of the memory card 46 may not be allowed.

Deletion of the profile information can be conducted by the owner user, only in the case where the profile information stored in the memory card 46 represents the owner user, that is, only in the case where the user of the memory card 46 is the owner user, similarly to the regular users. On the other hand, the owner user may be able to initialize any memory card including one in which profile information representing a regular user is stored.

When the user represented by the profile information stored in the memory card 46 under usage correspond to the registered user currently using the digital camera 10, the profile information may not be deleted at the initialization of the memory card 46. In this case, transmitting the profile information from the microprocessor 19 to the memory card 46 is not required.

The method for identifying the user attempting to use the digital camera 10, is not limited by inputting a user ID. For example, a power switch may detect the fingerprints of a user.

The invention is not limited to that described in the preferred embodiments, namely, various improvements and changes may be made to the present invention without departing from the spirit and scope thereof.

The present disclosure relates to subject matter contained in Japanese Patent Application No. 2005-032993 (filed on Feb. 9, 2005) which is expressly incorporated herein, by reference, in its entirety.

The invention claimed is:

1. A digital camera in which a storage medium can be inserted, the digital camera controlling initialization of the inserted storage medium by users of the digital camera based on profile information stored in the storage medium, the digital camera comprising:
a profile information storer that stores profile information representing a storage medium user in said storage medium inserted in said digital camera;
a profile information reader that reads said profile information;
a user identifier that identifies a digital camera user who is using said digital camera;
a storage medium initializer that initializes said storage medium inserted in said digital camera; and
a storage medium user judge that judges whether said storage medium user represented by said profile information, is said digital camera user or not,
wherein said storage medium can be initialized when it is judged that said storage medium user represented by said profile information stored in said storage medium is said digital camera user, and said storage medium can be initialized when it is judged that an owner user is using said digital camera,
wherein said storage medium can not be initialized when it is judged that said storage medium user represented by said profile information is not said digital camera user,
wherein said profile information indicates whether said storage medium user is the owner user or a regular user,
wherein a predetermined authorization is associated with the owner user that permits the owner user to register the regular user so that the regular user is permitted to use the digital camera, and
wherein the predetermined authorization is not associated with the regular user.

2. The digital camera according to claim 1, further comprising:
an image data eraser that erases image data stored in said storage medium inserted in said digital camera.

3. The digital camera according to claim 1, wherein when said storage medium initializer initializes said storage medium, said profile information storer regards said digital camera user as said storage medium user and stores said profile information.

4. The digital camera according to claim 1, wherein when said profile information reader does not read said profile information, said profile information storer regards said digital camera user as said storage medium user and stores said profile information.

5. The digital camera according to claim 1, further comprising:
a user register that registers a user who can use said digital camera as a registered user; and
a camera user judge that judges whether a user attempting to use said digital camera is said registered user or not;
wherein when said camera user judge judges said user attempting to use said digital camera is said registered user, said user identifier identifies which one of said registered users is said user attempting to use said digital camera.

6. The digital camera according to claim 5, wherein said camera user judge judges whether said user attempting to use said digital camera is said registered user or not, based on an identification code input by said user.

7. The digital camera according to claim 6, further comprising:
a profile information generator that generates said profile information based on said identification code.

8. The digital camera according to claim 5, wherein when said camera user judge judges said user attempting to use said digital camera is said registered user, said digital camera becomes operable.

9. The digital camera according to claim 1, further comprising:
a profile information eraser that erases said profile information from said storage medium inserted in said digital camera, wherein when said storage-medium user judge judges said storage medium user represented by said profile information is said digital camera user, said profile information eraser can erase said profile information from said storage medium.

10. The digital camera according to claim 1, further comprising:
a profile information eraser that erases said profile information from said storage medium inserted in said digital camera,
wherein when said user identifier identifies that a predetermined user is using said digital camera and said storage-medium user judge judges that said storage medium user is not said predetermined user, said profile information eraser can erase said profile information representing said storage medium user.

11. The digital camera according to claim 1, further comprising:
an image data storer that stores image data in said storage medium inserted in said digital camera;
wherein when said storage-medium user judge judges said storage medium user is not said digital camera user, said image data storer can store said image data of an image photographed by said digital camera user.

12. The digital camera according to claim 11, wherein said image data storer stores said image data to be related to user information representing said digital camera user who photographed said image.

13. The digital camera according to claim 11, further comprising:
an image data eraser that erases said image data from said storage medium inserted in said digital camera;
wherein said image data eraser can erase said image data of an image photographed by said digital camera user.

14. The digital camera according to claim 1,
wherein when said profile information reader can not read said profile information, said storage medium initializer initializes said storage medium.

15. A digital camera system, comprising:
a storage medium; and
a digital camera to which said storage medium can be inserted, comprising:
a profile information storer that stores profile information representing a storage medium user in said storage medium inserted in said digital camera;
a profile information reader that reads said profile information;
a user identifier that identifies a digital camera user who is using said digital camera;
a storage medium initializer that initializes said storage medium inserted in said digital camera; and
a storage medium user judge that judges whether said storage medium user represented by said profile information, is said digital camera user or not,
wherein said storage medium can be initialized when it is judged that said storage medium user represented by said profile information stored in said storage medium is said digital camera user, and said storage medium can be initialized when it is judged that an owner user is using said digital camera,
wherein said storage medium can not be initialized when it is judged that said storage medium user represented by said profile information is not said digital camera user,
wherein the profile information indicates whether said storage medium user is the owner user or a regular user,
wherein a predetermined authorization is associated with the owner user that permits the owner user to register the regular user so that the regular user is permitted to use the digital camera, and
wherein the predetermined authorization is not associated with the regular user.

* * * * *